United States Patent Office 3,127,386
Patented Mar. 31, 1964

3,127,386
POLYMERIZATION OF CIS-1,4-POLYISOPRENE
William M. Saltman, Akron, Ohio, assignor to The Goodyear Tire & Rubber Company, Akron, Ohio, a corporation of Ohio
No Drawing. Filed Nov. 6, 1958, Ser. No. 772,172
5 Claims. (Cl. 260—94.3)

This invention relates to the addition polymerization of isoprene. It also relates to new methods of preparing catalyst useful to polymerize isoprene. More specifically it relates to new methods to prepare cis-1,4-polyisoprene and to methods of preparing catalysts useful for this purpose.

It is known that certain oranometallic compounds are capable of producing a pronounced directive effect upon the manner in which monomeric isoprene molecules polymerize. That is to say, cerain organometallic compounds alone or in mixtures with other metal compounds when used as catalysts cause isoprene molecules to add to each other in a specific manner to form polyisoprene possessing essentially an all cis-1,4 or trans-1,4 structure. Polyisoprene having essentially an all cis-1,4 structure has proved very interesting in that it is analogous to natural Hevea rubber not only in structure but in its properties as well. For instance, it is known that when a catalyst comprising a suspension, in an inert solvent such as heptane, of a mixture of a metal alkyl such as aluminum triethyl or aluminum triisobutyl with a metal halide such as titanium tetrachloride in amounts such that the mol ratios of Al/Ti range from about 1/1 to less than 2/1, is used to polymerize isoprene, a polyisoprene possessing essentially an all cis1,4-structure is formed. However, it is also known if a mol ratio of Al/Ti is used that is 2.0/1 or above, little or no rubbery polymer is formed. If, on the other hand, a mol ratio lower than about 0.67/1 is used, the polyisoprene formed is not the desirable high cis-1,4 structure but that of a mixed cis-1,4, trans-1,4 and 3,4 structures. Further the maximum yield of polyisoprene possessing the desired cis-1,4 structure usually levels off below 100% conversion to solid polymer with this type of catalyst system when employed in usual concentrations of from 1.0 to 2.0 parts of total catalyst per 100 parts of isoprene by weight. It is believed that this lower conversion results from the formation of low molecular weight oils which are not recovered by normal coagulation methods. It has been observed that the extent of the loss depends at least in part on the metal alkyl employed. For instance, using aluminum triisobutyl yields of 70–75% are obtained and with aluminum triethyl only about 50% of the isoprene charged is recoverable as solid polymeric product. Still another problem encountered with these prior art processes known to produce cis-1,4-polyisoprene is that the molecular weight of the cis-1,4-polyisoprene is not as high as that of natural Hevea rubber, thus, the physical properties are not quite as good as those of natural rubber.

It is, therefore, the object of this invention to provide a method to improve isoprene polymerization. Another object is to provide a method whereby a higher yield of the cis-1,4-polyisoprene is formed. Another object is to provide a method whereby the molecular weight of the cis-1,4-polyisoprene formed is increased. Still another object is to provide a method whereby the total catalyst level required is reduced. Another object is to provide a method whereby the rate of polymerization is improved. Other objects will appear as the description proceeds.

These objects are accomplished by polymerizing isoprene in the presence of a catalyst system prepared by reacting an aluminum alkyl with titanium tetrachloride in an inert solvent in amounts that the mol ratio of aluminum to titanium (Al/Ti) ranges from about 0.8/1 to about 2.0/1 and then removing at least 30% and not more than 75% by volume of the inert solvent.

Generally to polymerize isoprene to form cis-1,4-polyisoprene in the presence of the catalyst system of this invention, the isoprene is dissolved in an inert solvent or diluent but isoprene may also be polymerized without the use of a diluent. The term inert solvent or diluent is meant to indicate that the solvent or diluent does not adversely affect the properties of the polymer nor does it enter into the structure of the polymer. Examples of inert solvents or diluents useful for this purpose are pentane, hexane, heptane, benzene, toluene, xylene and the like. Of these, the paraffinic hydrocarbons such as hexane, pentane or heptane are preferred. The solvent/monomer ratio employed is not critical and may be varied over wide ranges from no solvent, as in bulk polymerization techniques, up to 20/1 or more. However, it is preferred to utilize a solvent/monomer ratio of about 3 or 4/1. The temperature of polymerization to form polyisoprene may vary from a very low temperature such as 0° C. to a high of 90° C. or above. However, it is preferred to use a temperature of about 50° C. The polymerization of isoprene with these organometallic catalysts requires that moisture-free and air-free techniques which are well known to the art be employed to prevent deterioration of the catalyst activity. Generally, the amount of catalyst required has been added to the reaction vessel after the isoprene and solvent but the order of addition of the material is not important.

The catalyst system employed in the practice of this invention is readily prepared by reacting a solution of an aluminum alkyl in an inert solvent with a solution of titanium tetrachloride in an inert solvent wherein the mol ratio of Al/Ti ranges from about 0.8/1 to about 2/1 and then removing from at least 30% to not more than 75% of the inert solvent. This removal of the inert solvent, in which the reaction was allowed to proceed, thereby removes a proportional amount of the solvent-soluble portion of the reaction product of the aluminum alkyl and titanium tetrachloride. Suitable examples of the inert solvents in which aluminum alkyl and titanium tetrachloride are soluble are pentane, hexane, heptane and benzene. When aluminum alkyls and titanium tetrachlorides are allowed to react wherein the mol ratio of Al/Ti ranges from about 0.8/1 to about 2/1 there is formed as a reaction product a precipitate which is insoluble in the solvents mentioned before. This precipitate is isolated either by means of filtration or centrifugation and the desired amount of the solvent is then removed or alternately the precipitate may be allowed to settle and a portion of the supernatant liquid decanted. The insoluble precipitate portion of the reaction product is then redispersed or reslurried in the remaining solvent or optionally more fresh solvent added to maintain the original volume. Thus, it can be seen that the catalyst system of this invention has removed from it at least a portion of the hydrocarbon-soluble reaction product of the aluminum alkyl and titanium tetrachloride. It differs from the prior art catalyst systems, by this removal of at least a part of the hydrocarbon-soluble reaction product of the aluminum alkyls and titanium tetrachloride. In the preparation of the catalyst system of this invention, the mixing and handling of the two original components, as well as the finished catalyst system should be carried out using conventional techniques producing an oxygen- and moisture-free atmosphere, as moisture and oxygen tend to deteriorate these materials. These techniques are well known and therefore are not described here in detail. The concentrations of the solutions of aluminum alkyl and titanium tetrachloride used in the preparation of the catalyst of this invention are not critical, but it is well to use dilute solutions to minimize any errors in measurements and control the vigorous heat evolution during the reaction of these two materials. It is usually preferred to make up solutions of each of the components and then mix these solutions together. The aluminum alkyls useful to prepare the catalyst of this invention may be any aluminum alkyl such as aluminum triethyl, aluminum trimethyl, aluminum tripropyl, aluminum triisobutyl, aluminum trioctyl and the like. Of these, aluminum triisobutyl is preferred. The time and temperature of the reaction has not been found to be critical. However, a convenient time of about one hour and room temperature have been used.

In general, the amount of total catalyst required in the practice of the invention may vary from a minor catalytic amount such as 0.1 to a large excess such as 20 parts of catalyst by weight per 100 parts of monomers by weight. However, it is preferred to use from about 0.2 to 2 parts of total catalyst per 100 parts of monomers. By the term "total catalyst" is meant the weight of aluminum alkyl and the weight of titanium tetrachloride originally mixed together prior to the removal of a portion of the inert solvent. This treatment of the term "total catalyst" is required because of the difficulty in determining either the exact amount and chemical nature of soluble reaction product removed with the inert solvent or the exact amount and chemical nature of the proportions of aluminum and titanium remaining after the inert solvent, containing a portion of the soluble reaction product, is removed. Therefore, it will be our practice to report the catalyst levels in terms of the components from which they are prepared and the relative amounts of liquid removed rather than the actual amount of catalyst employed. The catalyst levels are actually reported in terms of parts by weight per 100 parts by weight of isoprene (p.h.m.) and the percent of liquid removed.

This invention is further illustrated by the following examples which are representative rather than restrictive of the scope of this invention In the following examples all experiments were conducted in clean, dry, four-ounce, screw capped bottles utilizing well-known air-free and moisture-free techniques. In each of the experiments 20 milliliters of refined and purified isoprene (13.6 grams) were dissolved in 80 milliliters of heptane as the inert diluent. Unless otherwise noted, the polymerization time was 17 hours at a temperature of 50° C. The polymers were processed in accordance with usual practices, i.e., alcohol coagulation, the addition of antioxidants and air drying.

The results of each of the examples are reported in terms of the polymer produced. Yield is reported in percent of original monomer converted to solid polymer. Where the dilute solution viscosity (D.S.V.) is reported it was measured on an 0.1% solution of polymer by weight in benzene. Dilute solution viscosity is an indication of molecular weight, usually the higher the D.S.V. the higher the molecular weight (all other parameters being equal). Where the structure of the polymer is reported, it is reported as being predominantly cis-1,4-polyisoprene or that the infrared spectra was similar to that of known cis-1,4-polyisoprene or natural Hevea rubber was determined by well known infrared spectrometer techniques. The specific amounts of catalyst in each example are reported in parts by weight per 100 parts of monomeric isoprene charged (p.h.m.).

*Example 1*

A catalyst was prepared from 10.0 milliliters of 0.323 molar titanium tetrachloride in heptane and 12.0 milliliters of 0.323 molar aluminum triisobutyl in heptane and allowed to react for one hour at room temperature. This corresponds to an Al/Ti mol ratio of 1.2/1. The mixture was centrifuged to separate the brown hydrocarbon-insoluble precipitate that formed, from the liquid phase. A portion containing 33% of the original liquid volume (7.3 milliliters) was withdrawn and discarded. It was calculated that 33% of the soluble reaction product was withdrawn and discarded by this technique. The precipitate was redispersed in the remaining liquid phase and the liquid removed was replaced by an equal volume of fresh heptane. A 2.2 milliliter portion of the catalyst dispersion was used to polymerize 20 milliliters of isoprene (13.6 grams). This corresponds to a total catalyst amount of 1.0 p.h.m.—33% removed. This experiment resulted in a polymer yield of 79.2% having a dilute solution viscosity of 2.37. This polymer exhibited an infrared spectrum indicating it was similar to known cis-1,4-polyisoprenes. Before the separation of the catalyst liquid, a 2.2 milliliter portion contained the equivalent of 0.323 millimol of titanium tetrachloride and 0.388 millimol of aluminum triisobutyl (1.2 x 0.323) corresponding to 1.0 p.h.m. of total catalyst by weight. As used, and after separation of a liquid portion, the 2.2 milliliter aliquot contained a lesser amount of catalyst. An exact division of the remaining components into molecular species is difficult because of the complex nature of the mixture. Further, it is generally not practicable to determine the residual catalyst left, since one portion is a liquid and the other is solid. It will therefore be our practice to report the catalyst levels in terms of the components from which they are prepared and by the relative amounts of liquid portion removed. (A similar condition exists for Examples 2, 3 and 4 also.)

*Example 2*

A similar experiment was conducted to that of Example 1 except that in the preparation of the catalyst a total of 66% of the solvent was removed and replaced with fresh solvent, thereby removing 66% of the soluble reaction product of aluminum triisobutyl and titanium tetrachloride. A 2.2 milliliter portion of this catalyst dispersion was used to polymerize 13.6 grams of isoprene. This corresponds to 1.0 p.h.m.—66% removed. This experiment resulted in an elastomeric polymer yield of 91.6% of a polymer having a dilute solution viscosity of 2.45. Upon infrared analysis this polymer exhibited a spectrum similar to that of known cis-1,4-polyisoprene.

*Example 3*

A catalyst was prepared from 16 milliliters of 0.323 molar aluminum triisobutyl solution in heptane and 8 milliliters of 0.323 molar titanium tetrachloride solution in heptane and allowed to react for one hour at room temperature. These amounts correspond to an Al/Ti mol ratio of 2/1. This mixture was centrifuged to separate the precipitate that formed from the liquid phase. A liquid portion containing 33% of the original volume (8.0 milliliters) was withdrawn and discarded. It is calculated that 33% of the soluble reaction product was withdrawn and discarded by this technique. The precipitate was resuspended again after the liquid removed was replaced by an equal volume of fresh heptane. A 3 milliliter portion of this slurry was used to polymerize 20 milliliters of isoprene. This corresponds to 1.4 p.h.m.—33% removed of catalyst. This experiment resulted in a yield of 9.1% of elastomeric polymer having a dilute solution viscosity of 2.5. This polymer exhibited an infrared spectrum indicating its similarity to known high cis-1,4-polyisoprene.

*Example 4*

A similar procedure was used to that of Example 3 except that in the preparation of the catalyst a total of 66% of the original liquid volume or solvent was removed, discarded and replaced by fresh heptane and the solid redispersed. A 3.0 milliliter portion of this catalyst was used to polymerize isoprene. This again corresponds to 1.4 p.h.m.—66% removed of catalyst. This experiment resulted in a yield of 11.2% of elastomeric polymer having a dilute solution viscosity of 2.9. This polymer upon infrared analysis exhibited a spectrum similar to that of known cis-1,4-polyisoprene.

Example 5

To compare the prior art catalyst systems with the catalyst system of this invention when used to polymerize isoprene, the following experiment was conducted. 1.0 milliliter of 0.323 molar titanium tetrachloride and 1.20 milliliters of 0.323 molar aluminum triisobutyl in heptane were used to polymerize 20 milliliters of isoprene in a manner similar to that of Example 1 or 2 except that none of the solvent was removed prior to its being used as the catalyst. This corresponds to an Al/Ti ratio of 1.2/1 and 1.0 p.h.m. of catalyst. This experiment resulted in a polymer yield of 48.3% exhibiting a dilute solution viscosity of 2.13.

Example 6

To compare the prior art catalyst systems wherein none of the solvent is removed with the catalyst system of this invention as catalyst useful to polymerize isoprene the following experiment was conducted.

A catalyst comprising 1.0 milliliters of 0.323 molar titanium tetrachloride solution and 2.0 milliliters of 0.323 molar aluminum triisobutyl in heptane was used to polymerize isoprene in a manner similar to that of Examples 4 and 5 except that none of the solvent was removed prior to this mixture being used as the catalyst. This corresponds to an Al/Ti mol ratio of 2/1 and 1.4 p.h.m. of catalyst. This resulted in a polymer yield of 0.8%. This polymer was not characterized because of the poor yield of isoprene converted to polyisoprene.

From the results obtained in the above examples, it can be readily seen that the catalyst of this invention exhibits a great improvement over the catalyst of the prior art. For instance, in Examples 1 and 2 the percent polymer yield is 79.2 and 91.6% respectively, whereas, the control, Example 5, which represents the nearest comparison which can be made of the prior art catalyst system produced only a 48.3% polymer yield. It should also be noted that the dilute solution viscosity of the polymers prepared by Examples 1 and 2 are both a higher value than the value of the dilute solution viscosity of the polymer of Example 5. This would indicate that the catalyst of this invention not only improves polymer yield but at the same time produces a polymer having a higher molecular weight. Likewise, the results of Examples 3 and 4 which represent the practice of this invention when compared to Example 6 which is the nearest comparison which can be made of the prior art catalyst system it will be observed that the polymer yield of 9.1% and 11.2% of Examples 3 and 4 are substantially higher than the polymer yield of 0.8% of the control or prior art as illustrated by Example 6.

Other experiments may be conducted using catalyst prepared from different aluminum alkyls such as aluminum triethyl, aluminum trimethyl, aluminum tripropyl and aluminum trioctyl and titanium tetrachloride, utilizing amounts so that the mol ratio of Al/Ti ranges from about 0.8/1 to about 2.0/1, in a manner similar to Examples 1, 2, 3 and 4. Also catalyst may be employed wherein other quantities of solvent varying anywhere from at least 30% up through about 75%, so as to remove at least 30% up to about 75% of the hydrocarbon soluble reaction product of the aluminum alkyl and titanium tetrachloride, may be removed, in addition to the 33% and 66% removed in Examples 1, 2, 4 and 5. In addition to other catalyst being employed, other amounts of catalyst may be employed as well as other diluents and diluent monomer ratios. Other times and temperatures of polymerization may be employed following the general teachings set forth elsewhere in this application and employing the general techniques of the aforementioned examples to obtain similar polymers. The choice of each of these factors is well within the skill of the polymerization chemist.

While certain representative embodiments and details have been shown for the purpose of illustrating the invention, it will be apparent to those skilled in this art that various changes and modifications may be made therein without departing from the spirit or scope of the invention.

What is claimed is:

1. A method for the preparation of polyisoprene which comprises forming cis-1,4-polyisoprene by polymerizing isoprene in the presence of a catalyst consisting essentially of one prepared by reacting an aluminum trialkyl and titanium tetrachloride in an inert solvent in amounts that the mol ratio of Al/Ti ranges from about 0.8/1 to about 2.0/1 to form hydrocarbon soluble and hydrocarbon insoluble reaction products and then removing at least 30% and not more than 75% of the inert solvent so as to remove at least 30% to about 75% of the hydrocarbons soluble reaction product of said aluminum trialkyl and titanium tetrachloride.

2. The method according to claim 1 in which 33% of the inert solvent is removed.

3. The method according to claim 1 in which 66% of the inert solvent is removed.

4. A method for the preparation of polyisoprene which comprises forming cis-1,4-polyisoprene by polymerizing isoprene in the presence of a catalyst consisting essentially of one prepared by reacting an aluminum trialkyl and titanium tetrachloride in an inert solvent in amounts that the mol ratio of Al/Ti ranges from about 0.8/1 to about 2.0/1 to form hydrocarbon soluble and hydrocarbon insoluble reaction products and then removing at least 30% and not more than 75% of the inert solvent so as to remove at least 30% to about 75% of the hydrocarbon soluble reaction product of said aluminum trialkyl and titanium tetrachloride, said polymerization taking place while the isoprene is dissolved in an inert solvent.

5. A method for the preparation of polyisoprene which comprises forming cis-1,4-polyisoprene by polymerizing isoprene in the presence of a catalyst consisting essentially of one prepared by reacting aluminum triisobutyl and titanium tetrachloride in an inert solvent in amounts that the mol ratio of Al/Ti ranges from about 0.8/1 to about 2.0/1 and then removing at least 30% and not more than 75% of the inert solvent so as to remove at least 30% to about 75% of the hydrocarbon soluble reaction product of said aluminum triisobutyl and titanuim tetrachloride.

References Cited in the file of this patent

UNITED STATES PATENTS

| | | |
|---|---|---|
| 2,832,759 | Nowlin et al. | Apr. 29, 1958 |
| 2,882,264 | Barnes et al. | Apr. 14, 1959 |

FOREIGN PATENTS

| | | |
|---|---|---|
| 533,362 | Belgium | May 16, 1955 |
| 543,292 | Belgium | June 2, 1956 |
| 546,846 | Belgium | Oct. 7, 1956 |
| 789,781 | Great Britain | Jan. 29, 1958 |
| 526,101 | Italy | May 14, 1955 |

OTHER REFERENCES

Gaylord et al.: "Linear and Stereoregular Addition Polymers," p. 92 (1959).